(12) United States Patent
Cognard

(10) Patent No.: US 10,656,391 B1
(45) Date of Patent: May 19, 2020

(54) LENS SYSTEM FOR A CAMERA MODULE

(71) Applicant: FotoNation Limited, Galway (IE)

(72) Inventor: Timothee Cognard, Galway (IE)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 16/368,540

(22) Filed: Apr. 2, 2019

(51) Int. Cl.
| | |
|---|---|
| *G02B 13/00* | (2006.01) |
| *H04N 5/225* | (2006.01) |
| *G02B 7/02* | (2006.01) |
| *G02B 9/64* | (2006.01) |

(52) U.S. Cl.
CPC ......... *G02B 13/0045* (2013.01); *G02B 7/021* (2013.01); *G02B 9/64* (2013.01); *H04N 5/2252* (2013.01); *H04N 5/2254* (2013.01)

(58) Field of Classification Search
CPC ...... G02B 13/0045; G02B 7/021; G02B 9/64; H04N 5/2254; H04N 5/2252
See application file for complete search history.

(56) References Cited

U.S. PATENT DOCUMENTS

| | | | |
|---|---|---|---|
| 8,749,892 B2 * | 6/2014 | Shabtay | G02B 7/102 359/648 |
| 9,091,843 B1 * | 7/2015 | Hudyma | G02B 13/18 |
| 2017/0276909 A1 | 9/2017 | Jung et al. | |

OTHER PUBLICATIONS

Christophe Gaschet, Wilfried Jahn, Bertrand Chambion, Emmanuel Hugot, Thibault Behaghel, Simona Lombardo, Sabri Lemared, Marc Ferrari, Stéphane Caplet, Stéphane Gétin, Aurélie Vandeneynde, and David Henry: "Methodology to design optical systems with curved sensors", Applied Optics, vol. 38, No. 4, 2019, pp. 973-978.
T. Steinich and V. Blahnik, "Optical design of camera optics for mobile phones," Adv. Opt. Technol.1, 51-58 (2012), THOSS Media and De Gruyter. DOI 10.1515/aot-2012-0002.
C. Gaschet, B. Chambion, S. Gétin, G. Moulin, A. Vandeneynde, S. Caplet, D. Henry, E Hugot, W. Jahn, T. Behaghelet al., "Curved sensors for compact high-resolution wide field designs," in "Novel Optical Systems Design and Dptimization XX," vol. 10376 (International Society for Optics and Photonics, 2017), vol. 10376, p. 1037603.
B. Guenter, N. Joshi, R. Stoakley, A. Keefe, K. Geary, R. Freeman, J. Hundley, P. Patterson, D. Hammon, G. Herreraet al., "Highly curved image sensors: a practical approach for improved optical performance," Opt. express vol. 25, No. 12, 13010-13023 (2017).
D. Reshidko and J. Sasian, "Optical analysis of miniature lenses with curved imaging surfaces," Appl. Opt. vol. 54, No. 28, E216-E223 (2015).

(Continued)

*Primary Examiner* — Ahmed A Berhan

(57) ABSTRACT

An optical system for a shallow form factor camera module comprises: seven even aspheric singlet lens elements formed of a molded plastics material, a flat image sensor, and a central aperture stop with at least 3 lens elements disposed in front of the aperture stop and at least 3 rear lens elements disposed between the aperture stop and the image sensor. The aperture stop has a pupil wide enough to provide at least f/1.0 aperture and the optical system has a total track length less than about 8.2 mm and a minimum spacing of about 0.6 mm between a surface of the rearmost lens element and an imaging plane of said image sensor. A magnitude of an aspheric coefficient for $h^4$ of at least one surface of each of said rear lens elements is greater than $5\times10^{-2}$.

8 Claims, 3 Drawing Sheets

(56) References Cited

OTHER PUBLICATIONS

H. Gross, W. Singer, M. Totzeck, F. Blechinger, and B. Achtner, Handbook of optical systems, vol. 4 (Wiley-Vch Weinheim, 2005).
S. Jung, D.-H. Choi, B.-L. Choi, and J. H. Kim, "Tolerance optimization of a mobile phone camera lens system," Appl. Opt. vol. 50, No. 23, 4688-4700 (2011).
D. T. Moore, "Gradient-index optics: a review," Appl. Opt. vol. 19, No. 7, 1035-1038 (1980).
Y. Yan and J. Sasian, "Miniature camera lens design with a freeform surface," in "Optical Design and Fabrication 2017 (Freeform, IODC,OFT)," (Optical Society of America, 2017), p. JTu3A.3.
S. Wang, P. C. Wu, V.-C. Su, Y.-C. Lai, M.-K. Chen, H. Y. Kuo, B. H.Chen, Y. H. Chen, T.-T. Huang, J.-H. Wanget al., "A broadband achromatic metalens in the visible," Nat. nanotechnology vol. 13, 227 (2018).
S. Banerji, M. Meem, B. Sensale-Rodriguez, and R. Menon, "Imaging with flat optics: metalenses or diffractive lenses?" arXiv preprintarXiv:1901.05042 (2019).

\* cited by examiner

| Surface | Radius (R) | Thickness | Material | Element | Clear Semi-Diameter | k | $A_1$ | $A_2$ | $A_3$ | $A_4$ | $A_5$ | $A_6$ |
|---|---|---|---|---|---|---|---|---|---|---|---|---|
| 1 | Infinity | 9.51E-01 | K26R_25 | 201a | 4.41E+00 | -4.92E-03 | -6.60E-04 | 6.29E-05 | -1.08E-05 | 7.50E-07 | -1.29E-08 | -1.63E-10 |
| 2 | -7.70E+01 | 4.99E-02 | | | 4.34E+00 | -6.58E-02 | 2.05E-03 | -3.09E-05 | -1.19E-05 | 1.29E-06 | -4.71E-08 | 5.21E-10 |
| 3 | 3.07E+01 | 7.87E-01 | EP5000 | 201b | 2.51E+00 | 1.24E-01 | 6.89E-03 | -2.08E-03 | 6.15E-04 | -1.48E-04 | 2.27E-05 | -1.77E-06 |
| 4 | 3.27E+01 | 5.26E-02 | | | 2.45E+00 | 7.97E-02 | -4.40E-03 | -1.21E-03 | 3.64E-04 | -7.46E-05 | 9.20E-06 | -6.77E-07 |
| 5 | -5.15E+01 | 4.00E-01 | K26R_25 | 201c | 2.21E+00 | 2.12E-01 | -4.08E-02 | 7.60E-03 | -4.98E-04 | -3.12E-04 | 8.63E-05 | -6.56E-06 |
| 6 | -1.55E+01 | 6.26E-01 | | | 1.96E+00 | 2.84E-01 | -4.42E-02 | 6.77E-03 | 1.08E-03 | -1.39E-03 | 3.48E-04 | -2.92E-05 |
| Stop | Infinity | 4.60E-01 | | | 1.88E+00 | | | | | | | |
| 8 | -1.05E+01 | 1.00E+00 | K26R_25 | 203a | 1.73E+00 | 7.56E-02 | -2.17E-02 | 6.25E-03 | -6.05E-03 | 1.89E-03 | -3.41E-04 | 2.65E-05 |
| 9 | -3.81E+00 | 2.00E-01 | | | 1.94E+00 | 1.48E-01 | -5.23E-02 | 1.25E-02 | -5.56E-03 | 9.66E-04 | 9.21E-05 | -3.10E-05 |
| 10 | -2.95E+00 | 1.00E+00 | EP5000 | 203b | 1.96E+00 | 1.69E-01 | -7.37E-02 | 3.35E-02 | -1.39E-02 | 3.17E-03 | -1.74E-04 | -2.87E-05 |
| 11 | -2.33E+01 | 5.08E-02 | | | 2.25E+00 | -1.79E-01 | 2.71E-02 | -1.18E-02 | 1.34E-03 | 3.08E-04 | -9.89E-05 | 5.97E-06 |
| 12 | -6.49E+01 | 1.00E+00 | K26R_25 | 203c | 2.28E+00 | -9.33E-02 | 8.95E-02 | -3.31E-02 | 3.67E-03 | 3.47E-04 | -1.29E-04 | 3.21E-06 |
| 13 | -8.52E+00 | 2.23E-01 | | | 3.01E+00 | -1.18E-02 | 7.42E-02 | -2.87E-02 | 5.63E-03 | -7.42E-04 | 5.24E-05 | -1.35E-06 |
| 14 | 6.17E+01 | 6.95E-01 | K26R_25 | 203d | 3.47E+00 | 2.11E-02 | -3.56E-02 | 5.38E-03 | -5.41E-04 | 3.90E-05 | -1.61E-06 | 2.73E-08 |
| 15 | 7.00E+00 | 8.20E-01 | | | 3.60E+00 | 1.25E-01 | -6.25E-02 | 1.07E-02 | -1.15E-03 | 5.05E-05 | 2.42E-08 | -4.46E-08 |
| Image | Infinity | 0.00E+00 | | | 3.73E+00 | | | | | | | |

Figure 3

LENS SYSTEM FOR A CAMERA MODULE

FIELD

The present invention relates to a camera module.

BACKGROUND

The camera module of shallow form factor devices such as smartphones, security cameras, automotive system cameras, industrial inspection systems, or some video or photographic devices is an important element of the device. However, the camera module remains an optical design challenge because of the requirement for a shallow form factor, the optical materials available and cost constraints.

Typically lens f-numbers for miniature camera modules of the type used in smartphones range from f/2.0 to as low as f/1.5, for example, as disclosed in: The-Verge, 27 Feb. 2018, "The galaxy S9's dual-aperture camera is great marketing", with the trend being to attempt to increase the aperture size to enable an increase in angular resolution and so provide higher resolution images. Nonetheless, while larger aperture stops improve the Signal to Noise Ratio (SNR) in acquired images, this can be at the expense of increased optical aberration. In other applications, such as action cameras, vlog cameras, wherein the required resolution may not be as high as for still images, making wider-aperture and so faster lenses is also desirable.

Typically, optical systems for miniature camera modules feature a frontal (i.e. furthest from the image sensor) or second element aperture stop and typically 5 to 6 lens elements, the last one closest to the image sensor functioning as a field flattener, for example, as disclosed in: US 2017/0276909 and T. Steinich and V. Blahnik, "Optical design of camera optics for mobile phones," Adv. Opt. Technol. 1, 51-58 (2012). The frontal position of the aperture stop reduces the total length of the system at the expense of aberration correction.

The lens elements for such optical systems are typically molded polymer materials, rather than glass, which is typically ground to shape. It can be both easy and cheap to produce highly aspherical surfaces suitable for aberration correction, nonetheless, the polymer materials used in such lens elements offer less diversity in refractive index and Abbe number when compared with glasses.

Curved image sensors remove or reduce the need for field flattening of the image plane. C. Gaschet et al, "Curved sensors for compact high-resolution wide field designs," in "Novel Optical Systems Design and Optimization XX," vol. 10376 (International Society for Optics and Photonics, 2017), vol. 10376, p. 1037603; and B. Guenter et al., "Highly curved image sensors: a practical approach for improved optical performance," Opt. express 25, 13010-13023 (2017) disclose wide-aperture non-symmetrical optical systems adapted for such sensors. D. Reshidko and J. Sasian, "Optical analysis of miniature lenses with curved imaging surfaces," Appl. Opt. 54, E216-E223 (2015) disclose that such systems can reach an f/1.2 aperture while remaining compact.

Referring now to FIG. 1, a "double-Gauss" optical system 100, such as are commonly employed in digital single lens reflex (DSLR) systems, is shown. Such systems comprise a central aperture stop 102 and, due to this symmetry, can balance aberrations and can compensate most of the coma, distortion and lateral chromatic aberration within the system. Indeed, in a perfectly symmetrical system, odd Zernike polynomials are compensated almost perfectly. H. Gross et al, "Handbook of optical systems", vol. 4 (Wiley-Vch Weinheim, 2005) discloses such a double-Gauss system used for f/1.0 or larger apertures. Double-Gauss lenses usually come with a minimum of 6-elements, typically with two cemented doublets 104a, 104b around the aperture stop. Extra lens elements 106 at the back of the optical system correct aberrations. Nonetheless, such systems have a very large back focal length in order to accommodate for the mirror used in DSLR systems.

It will be appreciated that in applications requiring a shallow form factor such as smartphones, such large back focal distances are not acceptable.

SUMMARY

According to the present invention, there is provided a camera module according to claim 1.

Embodiments provide a camera module including a double-Gauss type optical system with 7-elements, a flat sensor and a central stop position with a wide pupil so providing a fast lens.

Embodiments provide a f/1.05 mm focal length camera module including a ⅓ inch sensor suitable for incorporation in shallow form factor devices such as smartphones.

According to a further aspect, there is provided a smartphone incorporating the camera module of claim 1.

DESCRIPTION OF THE DRAWINGS

An embodiment of the invention will now be described, by way of example, with reference to the accompanying drawings, in which:

FIG. 3 illustrates an exemplary set of aspheric coefficients for the elements of the optical system of FIG. 2.

DESCRIPTION OF THE EMBODIMENT

Figure 1:
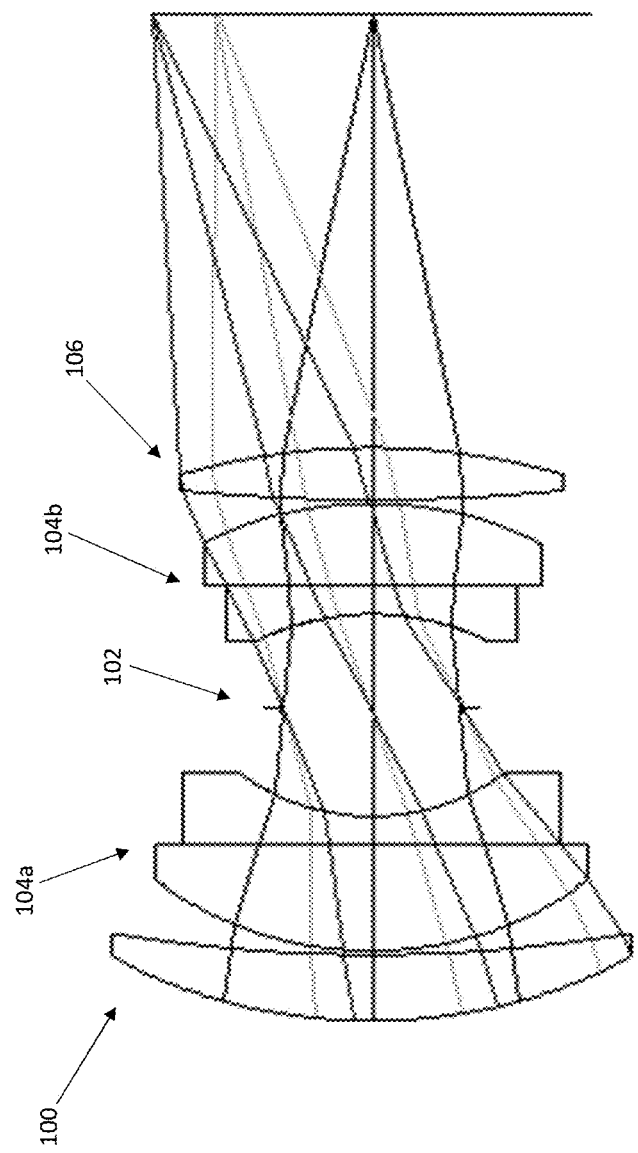
FIG. 1 shows a conventional 6 element double-Gauss optical system for a DSLR camera.
Figure 2:
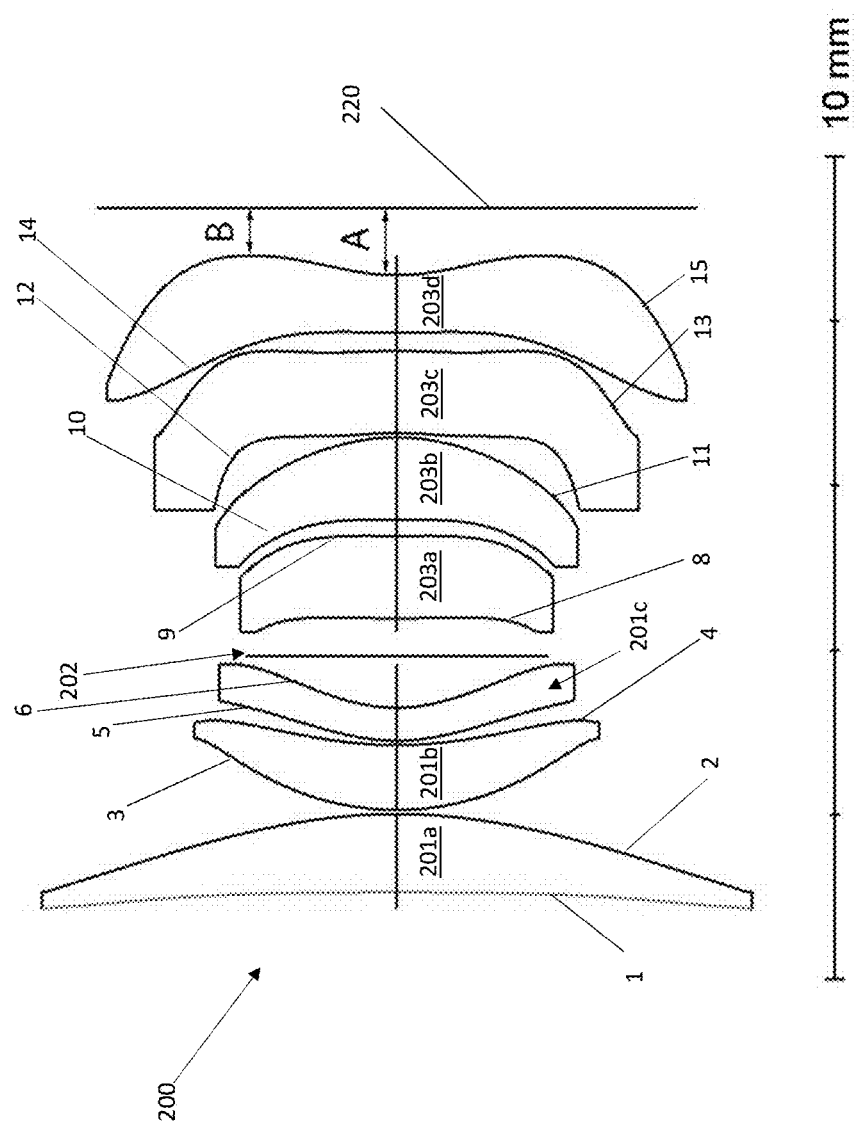
FIG. 2 shows an optical system for a camera module according to an embodiment of the present invention.

Referring now to FIG. 2, there is shown a 7-element double-Gauss optical system 200 for incorporation in a camera module according to an embodiment of the present invention. The assembly comprises: 3 frontal elements 201a-201c, a central aperture stop 202, 4 rear elements 203a-d and a ⅓ inch (4.8 mm×3.6 mm) sensor 220.

All of the lens elements 201, 203 are even aspheric singlets which enables extra degrees of freedom from an optical design point of view.

Referring now to FIG. 3, which illustrates the aspheric coefficients for each element of the optical system 200, where the sag z at height h for the surface of each element is described by the formula below:

$$z = f(h^2, R, k) + A_1 h^4 + A_2 h^6 + A_3 h^8 + A_4 h^{10} + A_5 h^{12} + A_6 h^{14},$$

where R is radius of curvature;
k is conic constant; and $$f(h^2, R, k) = \frac{h^2}{R + \sqrt{R^2 - (k+1)R^2}}.$$

Note that all units of length in FIG. 3 are in millimetres. Also note that the formula provided for $f(h^2, R, k)$ is exemplary and there are a variety of ways of representing this component of sag. As will be seen from FIG. 3, in this implementation, the optical system 200 comprises 5 elements 201a, 201c, 203a, 203c and 203d made of K26R and 2 elements 201b and 203b made of EP5000. At 25 degrees Celsius, K26R has a refractive index n=1.53 and an Abbe number V=56 whereas EP5000 has a refractive index n=1.63 and an Abbe number V=24. As such, K26R corresponds to a crown glass and EP5000 corresponds to a flint glass. Both plastics materials are industry-standard and can be moulded in order to achieve aspherical lens elements.

It will be seen that the curvature of the surfaces of the lens elements are defined by high-order aspheric coefficients and in particular, the magnitiude of the $h^4$ coefficients for surfaces 9, 10, 12, 13 and 15 is greater than $5 \times 10^{-2}$.

The system is optimized for a 1 m distance from the subject to the camera, which corresponds to a typical portrait distance.

The system has a total track length (TTL) of 8.2 mm from the frontal element to the image sensor. This is thicker than some assemblies currently used in smartphones, but it will be appreciated that the optical system could be incorporated in a camera module fitting in a 10-12 mm thick device.

In order to limit vignetting and because the resolution drops quickly towards the edges of the image, the actual imaging circle is extended to cover a 1/2.7 inch (5.37×4.04 mm) sensor area while only a ⅓ inch sensor 220 is employed.

The optical system has a target focal length of 5 mm, corresponding to a 35 mm equivalent focal length for a 24×36 mm full frame sensor. The field of view is 54×38 degrees.

From left to right in FIGS. 2 and 3, one can observe:
The first 201a and second 201b lens elements have a positive optical power, with the first lens element being comparatively flat for optimal compactness.
The third lens element 201c has little optical power, it mostly helps to reduce the spherical aberration and coma introduced by the first two lenses.
The lens stop 202 is in the front part of the optical system.
The fourth lens element 203a has little power and helps correct some of the distortion.
The fifth lens element 203b has negative optical power and also corrects for distortion.
The last two elements 203c, 203d act as field flatteners as well as reducing astigmatism and coma aberrations.

The minimum element thickness is 0.4 mm (third element 201c) and the maximum thickness is 1.0 mm (sixth element 203c). The air distance is reduced to a minimum, being almost null except around the stop 202 of the system (0.63 mm before and 0.46 mm after) and around the last element 203d (0.223 mm before and 0.82 mm after).

One constraint is the back focal length (the distance between the last optical element and the imaging plane). Although smartphone systems do not require extra space for flip mirrors like DSLRs, some distance is still required for example, for a micro-lens array and/or colour filters, typically 0.6 mm. On the other hand, the last lens is used as a field flattener and the effectiveness of the field flattener is reduced if placed further away from the image plane. Thus, the illustrated optical system 200 has a back-focal length of 0.82 mm from the centre of the lens (distance A from last lens element centre to image plane in FIG. 2), or 0.6 mm from the imaging plane (distance B from last element to image plane in FIG. 2).

The optical system 200 exhibits some pincushion distortion, with distortion of around −2% for the ⅓ inch sensor size of the present embodiment and up to −9% if a larger 1/2.7 inch size sensor were used. Several aberrations are still visible such as spherical aberration, astigmatism and to a lesser extent some coma and field curvature.

In any case, it will be seen that the embodiment provides a f/1.0 optical system for a camera module suitable for incorporation in shallow form factor devices such as smartphones.

Simulations of the optical system 200 using manufacturing tolerances for each element (radius of curvature, asphericity, thickness, local variation of the Abbe number and refractive index) and the assembly of the elements (centring, tilt of the elements, spacing between elements) typical of current manufacturing processes such as described in S. Jung, D.-H. Choi, B.-L. Choi, and J. H. Kim, "Tolerance optimization of a mobile phone camera lens system," Appl. Opt. 50, 4688-4700 (2011) indicate the optical system 200 will produce acceptable results.

Nonetheless, depending on the application for the camera module including the optical system 200, one could either optimize for the centre of the image (high resolution portrait application) or lower the resolution across the frame for better uniformity (fast lens action application).

Variations of the above described embodiment are possible:

Currently, plastic materials used for mobile phone optical systems offer a limited range of refractive index and Abbe number. These two parameters are critical for the image quality and chromatic aberrations of the system. The development of higher refractive index plastics could bring some improvement to the optical system 200 described above. Another approach is the one offered by GRIN materials, such as disclosed in D. T. Moore, "Gradient-index optics: a review," Appl. Opt. 19, 1035-1038 (1980), where the index varies across the lens radius or thickness. Such variations can be used to better control aberrations and bring extra degrees of freedom to the optical design.

Freeform lens elements such as described in Y. Yan and J. Sasian, "Miniature camera lens design with a freeform surface," in "Optical Design and Fabrication 2017 (Freeform, IODC, OFT)," (Optical Society of America, 2017), p. JTu3A.3 can also bring some extra degrees of freedom for the optical system 200.

Meta-surfaces such as disclosed in S. Wang et al., "A broadband achromatic meta-lens in the visible," Nat. nanotechnology 13, 227 (2018) could replace some of the lens elements 201, 203.

Finally, diffractive lenses such as disclosed in S. Banerji et al, "Imaging with flat optics: metalenses or diffractive lenses?" arXiv preprint arXiv:1901.05042 (2019) are easier to manufacture while providing superior performance.

The invention claimed is:
1. A camera module for a shallow form factor device, the camera module comprising an optical system comprising:
seven even aspheric singlet lens elements formed of a molded plastics material, a flat image sensor, and
a central aperture stop with at least 3 lens elements disposed in front of said aperture stop and at least 3 rear lens elements disposed between said aperture stop and said image sensor, said aperture stop having a pupil wide enough to provide an aperture having an f-number of at least f/1.0,
wherein said optical system has a total track length (TTL) less than about 8.2 mm and a minimum spacing of about 0.6 mm between a surface of the rearmost lens element and an imaging plane of said image sensor where sag z at height h for a surface of each lens element is described by the formula:

$$z = f(h^2, R, k) + A_1 h^4 + A_2 h^6 + A_3 h^8 + A_4 h^{10} + A_5 h^{12} + A_6 h^{14},$$

where R is radius of curvature;
k is conic constant; and
$A_1$ to $A_6$ are aspheric coefficients, where a magnitude of an aspheric coefficient $A_1$ of at least one surface of each of said rear lens elements is greater than $5 \times 10^{-2}$.

2. The camera module according to claim 1 wherein said optical system has a back-focal length about 0.82 mm from the centre of the lens.

3. The camera module according to claim 1 wherein said optical system has a target focal length of about 5 mm.

4. The camera module according to claim 1 wherein the plastics materials for said lens elements have a refractive index of n=1.53 and an Abbe number V=56; or a refractive index n=1.63 and an Abbe number V=24 at 25° C.

5. The camera module according to claim 1 wherein said image sensor has an area of 4.8 mm×3.6 mm.

6. The camera module according to claim 1 comprising 4 rear lens elements and wherein from front to rear:

a first and second of said lens elements have a positive optical power,
a third lens element is configured to reduce a spherical aberration and coma introduced by the first two lens elements,
a fourth and fifth of said lens elements correct for distortion, and
a sixth and seventh of said lens elements act as field flatteners.

7. The camera module according to claim 1 wherein:

$$f(h^2, R, k) = \frac{h^2}{R + \sqrt{R^2 - (k+1)R^2}}.$$

8. A smartphone incorporating the camera module of claim 1 and further comprising a processor operatively coupled to said image sensor and being arranged to read image data from said image sensor and to write said image data to a memory.

* * * * *